(12) United States Patent
Ohtsuka et al.

(10) Patent No.: US 6,264,375 B1
(45) Date of Patent: Jul. 24, 2001

(54) FIBER OPTIC CONNECTOR FERRULE AND METHOD OF MAKING THE SAME

(75) Inventors: Kenichiro Ohtsuka; Tomohiko Ueda; Toshiaki Kakii, all of Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/413,204

(22) Filed: Oct. 5, 1999

(51) Int. Cl.⁷ ..................................................... G02B 6/36
(52) U.S. Cl. ................. 385/78; 385/60; 385/72; 264/1.25
(58) Field of Search .................. 385/56, 59, 60, 385/65, 72, 78, 75, 76, 80–85, 88–94; 264/1.25; 156/153

(56) References Cited

U.S. PATENT DOCUMENTS 5,815,621 * 9/1998 Sakai et al. .......................... 385/80

FOREIGN PATENT DOCUMENTS 11-72651 3/1999 (JP) .

* cited by examiner

*Primary Examiner*—Phan T. H. Palmer
(74) *Attorney, Agent, or Firm*—McDermott, Will & Emery

(57) ABSTRACT

A fiber optic connector ferrule in which a coating-accommodating portion for mounting a coated portion of an optical fiber and maintaining the optical fiber such that the axis thereof becomes substantially straight from the mounted portion to the front end is formed behind a fiber-arranging hole by the steps of: disposing one or a plurality of mold pins each having a columnar portion formed on a distal end side thereof and a prismatic portion, disposed on a proximal end side thereof, having substantially a quadrangular cross section, with side faces of the prismatic portions being in contact with each other, within a mold such that each mold pin is slidable in an axial direction of the columnar and prismatic portions; and filling the mold with a resin, and axially pulling off each mold pin after the resin is cured, thereby causing the columnar portion to form the fiber-arranging hole and causing the prismatic portion to form the coating-accommodating portion for mounting the coated portion.

5 Claims, 10 Drawing Sheets

FIBER OPTIC CONNECTOR FERRULE AND METHOD OF MAKING THE SAME

BACKGROUND OF THE INVENTION

1. Field of the Invention

The present invention relates to a fiber optic connector ferrule for arranging optical fibers, and a method of making the same.

2. Related Background Art

In general, when optical fiber ribbons are to be connected to each other, the coating is removed from an end portion of optical fiber ribbons so as to expose each optical fiber, and a fiber optic connector ferrule made of a synthetic resin for arranging the optical fibers is attached to this end portion, thereby establishing the connection. The connector ferrule is used for accurately arranging the optical fibers. FIG. 11 shows the configuration of a typical fiber optic connector ferrule manufactured to JIS C 5981.

The fiber optic connector ferrule 102 shown in FIG. 11 has a plurality of parallel fiber-arranging holes 120 for arranging the respective optical fibers therewithin. Disposed on the inside or the fiber insertion side of each fiber-arranging hole 120 is a tapered portion 121 whose inside diameter gradually increases so as to continue to a groove portion 122. The connector ferrule 102 also has an open portion 123 used for receiving an adhesive for securing an optical fiber ribbon 103 (see FIGS. 13 and 14), a pin hole 124 into which a guide pin is inserted at the time of connecting with the other fiber optic connector ferrule to be paired.

While the connector ferrule 102 is being molded by transfer molding or injection molding, each fiber-arranging hole 120 is formed by an axially-slidable mold pin 101 (see FIG. 12) disposed within a mold (not shown) adapted to open vertically. For easier understanding of the structure, only two mold pins 101 are shown in FIG. 12. Each mold pin 101 is a round pin having a circular cross section, and is constituted by a first columnar portion 101a, a second columnar portion 101c having an outside diameter greater than that of the first columnar portion 101a, and a tapered portion 101b connecting the first and second columnar portions 110a, 101c, all of which are concentric. The mold pins 101 are held by holding members 113 on the proximal end side thereof. At this time, a plurality of mold pins 101 are accurately positioned by V-shaped grooves 114 of one of the holding members 113.

SUMMARY OF THE INVENTION

When the connector ferrule 102 is molded by use of the mold pins 101, a certain extent of thickness H is necessary in the holding member 113 on the V-shaped groove 114 side since the mold pins 101 are held by the V-shaped grooves 114. Then, since the connector ferrule 102 is formed while the holding members 113 are being inserted into the mold, a step may be formed behind the groove portions 122, i.e., further on the fiber insertion side, as shown in FIG. 13.

Consequently, as shown in FIG. 13, when an optical fiber ribbon 103 is inserted into the connector ferrule 102, coated portion 131 of the optical fiber ribbon 103 may not be supported from the lower side, whereby optical fibers 130 in the optical fiber ribbon 103 may bend. This case has been problematic in that transmission characteristics deteriorate due to a bending stress and, at worst, the optical fibers 130 may break while being used. Similar problems may also occur in the case where a fiber optic connector ferrule without the open portion 123 is manufactured.

Also, although not usually done, the coated portion 131 may be inserted to the inner end of the connector ferrule 102 in order to be supported from the lower side as shown in FIG. 14. Though the coated portion 131 is positioned on the groove portion 122 in this case, the lower face of the coated portion 131 would align with the axis of the optical fiber 130 within the fiber-arranging hole 120. As a consequence, the optical fibers 130 may also bend. For eliminating the above-mentioned problems and stably connecting optical fiber ribbons 103 to each other, there has been a demand for further improvements in making a fiber optic connector ferrule which can securely hold not only the optical fibers 130 but also the coated portion 131.

Therefore, it is an object of the present invention to provide a fiber optic connector ferrule which prevents transmission characteristics of an optical fiber from deteriorating and has no danger of damaging the optical fiber, and a method of making the same.

For achieving the above-mentioned object, the method of making a fiber optic connector ferrule in accordance with the present invention is a method of making a fiber optic connector ferrule in which one or a plurality of fiber-arranging holes for arranging and securing respective optical fibers are provided, the method comprising the steps of: (1) disposing one or a plurality of mold pins each having a columnar portion formed on a distal end side thereof and a prismatic portion, disposed on a proximal end side thereof, having substantially a quadrangular cross section, with side faces of the prismatic portions being in contact with each other, within a mold such that each mold pin is slidable in an axial direction of the columnar and prismatic portions; and (2) filling the mold with a resin, and axially pulling off each mold pin after the resin is cured, thereby each of fiber-arranging holes being formed and a coating-accommodating portion for mounting a coated portion of the respective optical fibers being formed.

In the fiber optic connector ferrule made by this method, the coating-accommodating portion can maintain the axis of the optical fiber substantially straight to the front end in the respective fiber-arranging hole. This fiber optic connector ferrule securely holds the optical fibers at the portion that are likely to bend, i.e., the area ranging from the front end of the coated portion to the end of the optical fibers.

Also, since the proximal end side of the mold pin is formed as the prismatic portion, it is advantageous in that no burrs would occur on the insertion side of the coating-accommodating portion in the accomplished fiber optic connector ferrule, whereby the optical fiber can be prevented from being damaged by burrs, and that the positioning of the optical fibers in the optical axis direction can be achieved without being prevented by burrs. Conventionally, since the mold pin 101 (see FIG. 12) having a circular cross section has been used, there have been cases where a resin immerses into the V-shaped groove 114. Such immersing resin forms burrs on the insertion side of the groove portion 122.

At least one side edge of the prismatic portion may be chamfered along the lengthwise direction of the mold pin, and this chamfered portion is disposed, when the mold pins are arranged within the mold, at a part forming the coating-accommodating portion. As a consequence, in the molded fiber optic connector ferrule, the coating-accommodating portion is provided with a guiding projection for guiding the optical fiber to be inserted into the fiber-arranging hole. As a result, a workability of attaching the optical fiber ribbon to the fiber optic connector ferrule will be improved.

It is preferred that a tapered portion whose outside diameter gradually expands in a direction away from the columnar portion is disposed between the columnar portion and the prismatic portion. This tapered portion forms a fiber-guiding portion, at the insertion-side end portion of the fiber-arranging hole in the fiber optic connector ferrule, for guiding the optical fiber to be inserted into the fiber-arranging hole. As a result, when the optical fiber is to be attached to the fiber optic connector ferrule, the optical fiber can be smoothly inserted into the fiber-arranging hole without being damaged. When the tapered portion is used together with the above-mentioned chamfered portion forming the guiding projection, the operation of attaching the optical fiber to the fiber optic connector ferrule can further be smoothed.

The upper or lower side part of the prismatic portion may be provided with a predetermined notch, which is used for positioning and arranging each mold pin at a predetermined position within the mold, since all mold pins can accurately be arranged thereby.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
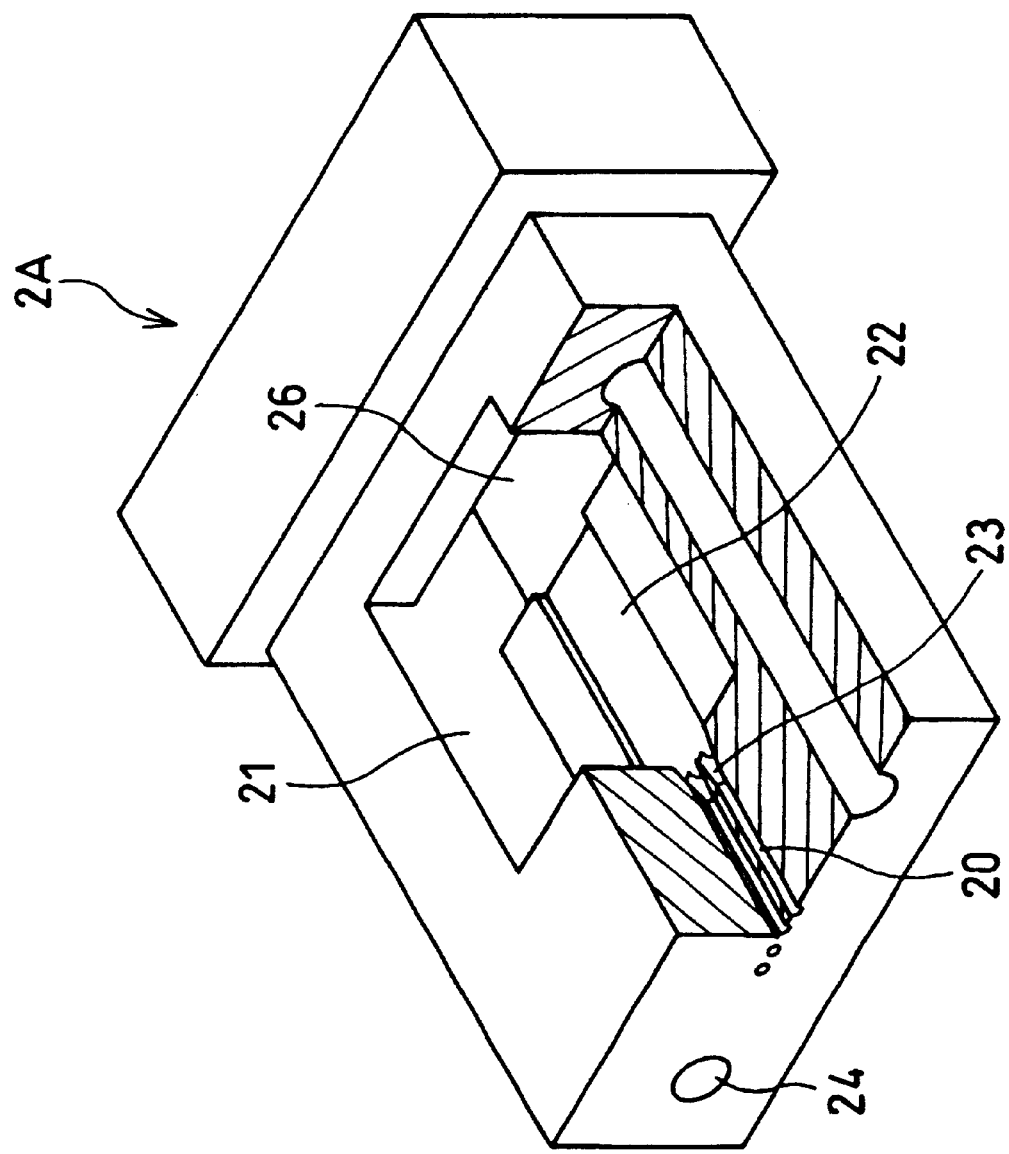
FIG. 1 is a perspective view showing the configuration of a first embodiment of the fiber optic connector ferrule in accordance with the present invention.

In the following, preferred embodiments of the present invention will be explained in detail with reference to the accompanying drawings. To facilitate the comprehension of the explanation, the same reference numerals denote the same parts, where possible, throughout the drawings, and a repeated explanation will be omitted.

FIG. 1 is a perspective view showing the configuration of a first embodiment of the fiber optic connector ferrule in accordance with the present invention.

Figure 11:
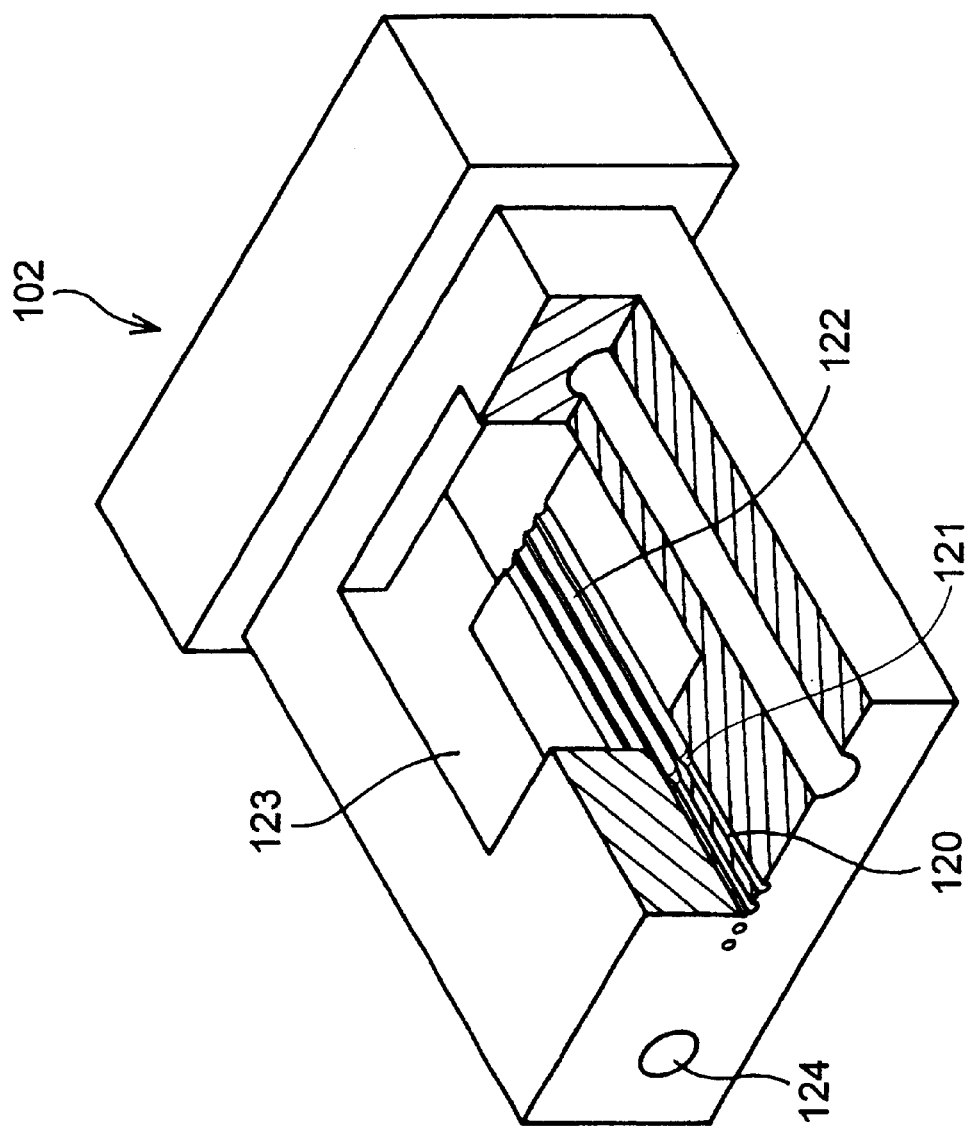
FIg. 11 is a perspective view showing the configuration of a conventional fiber optic connector ferrule.
Figure 12:
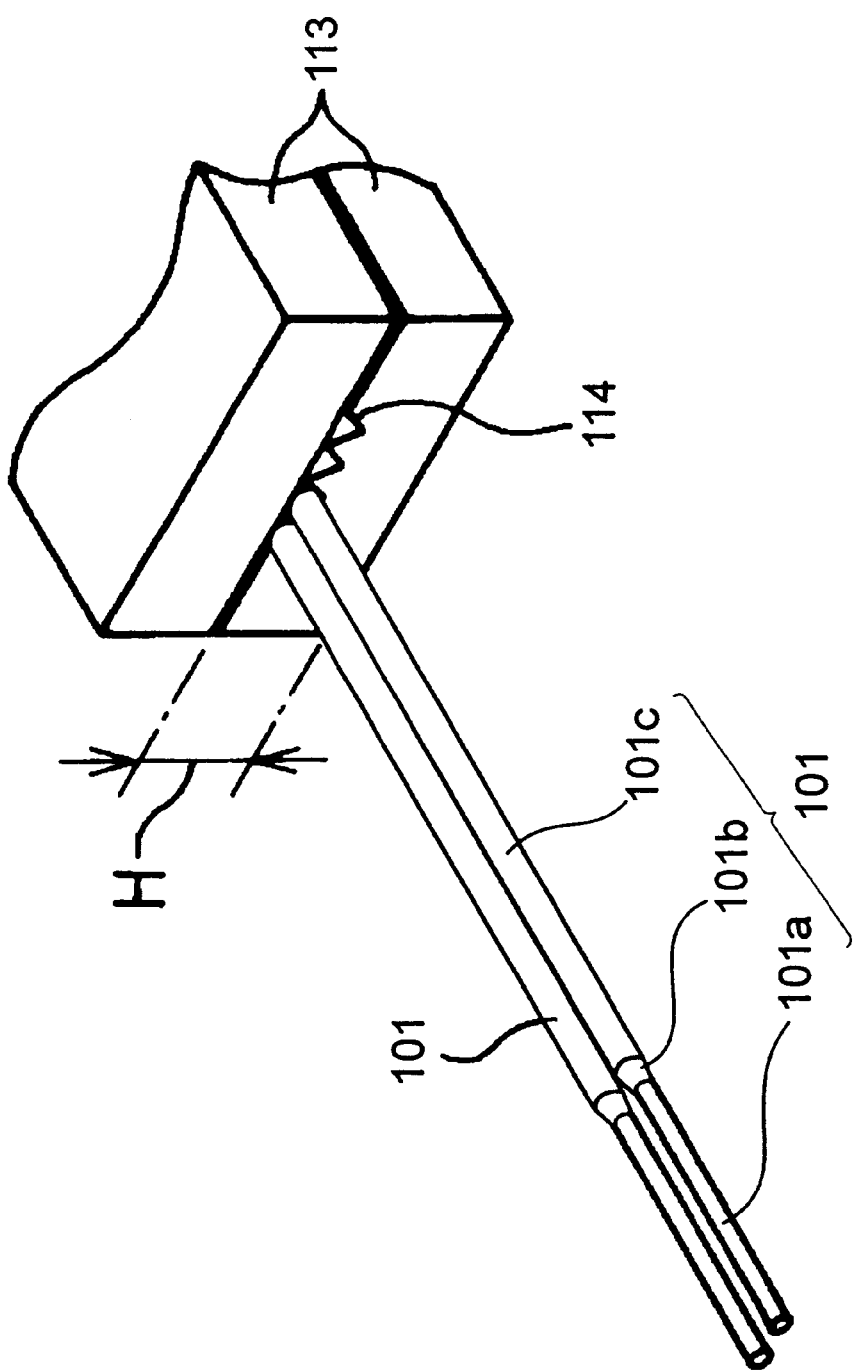
FIG. 12 is a perspective view showing a mold pin used for making the connector ferrule of FIG. 11.
Figure 13:
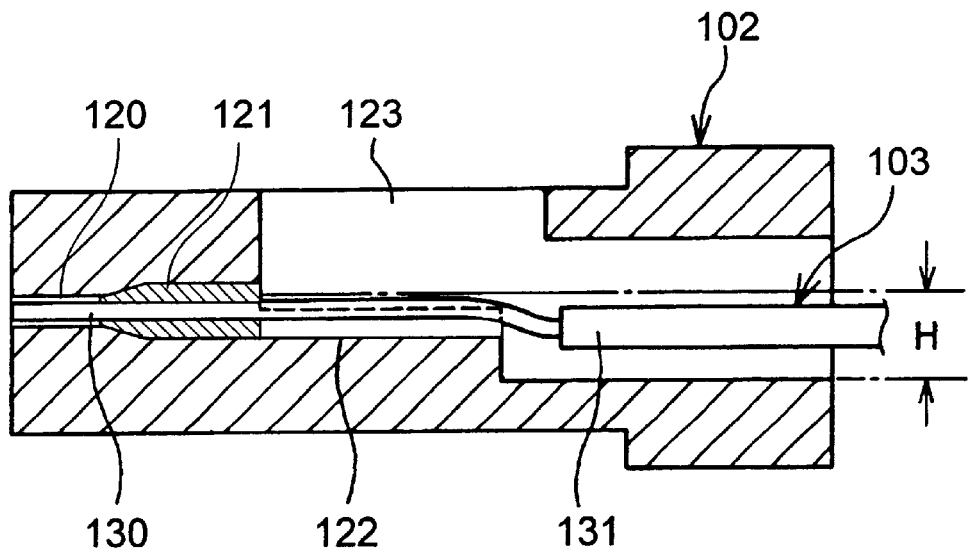
FIGS. 13 and 14 are sectional views showing respective states where an optical fiber ribbon is attached to the conventional fiber optic connector ferrule.
Figure 14:
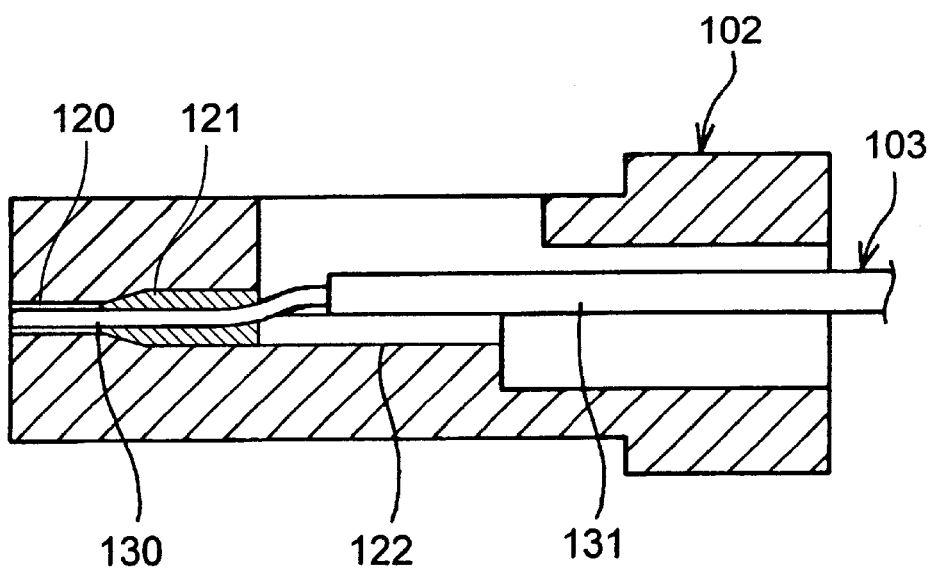

The basic configuration of this fiber optic connector ferrule 2A is identical to that of the conventional fiber optic connector ferrule shown in FIG. 11 except that a coating-accommodating portion 22 shaped like a flat groove having a flat floor face is formed further on the fiber insertion side of the fiber-guiding portion 23. Also, an inlet 26 is formed behind the coating-accommodating portion 22.

Figure 2:
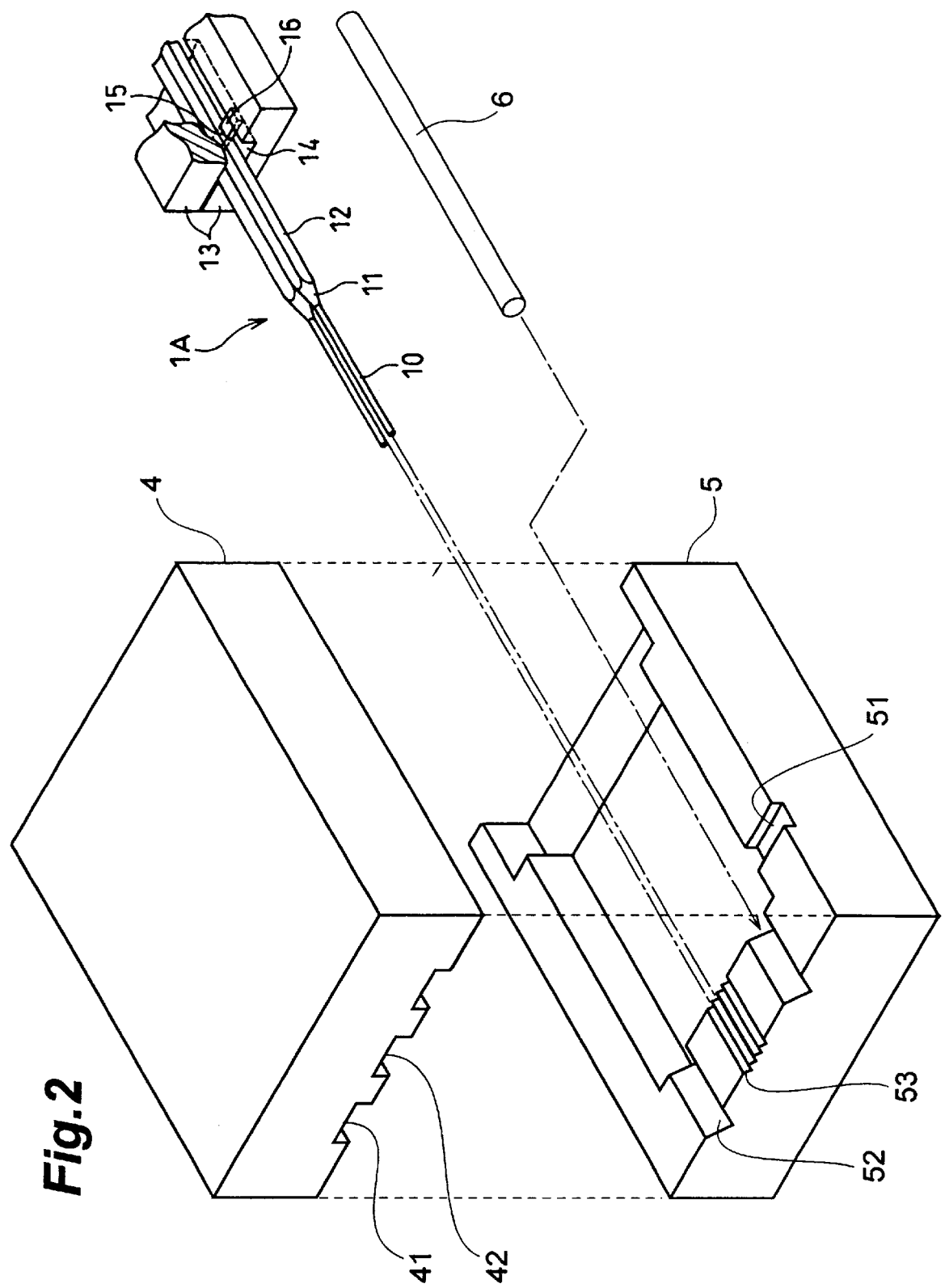
FIG. 2 is an exploded perspective view of a mold used for manufacturing the connector ferrule of FIG. 1.
Figure 3:
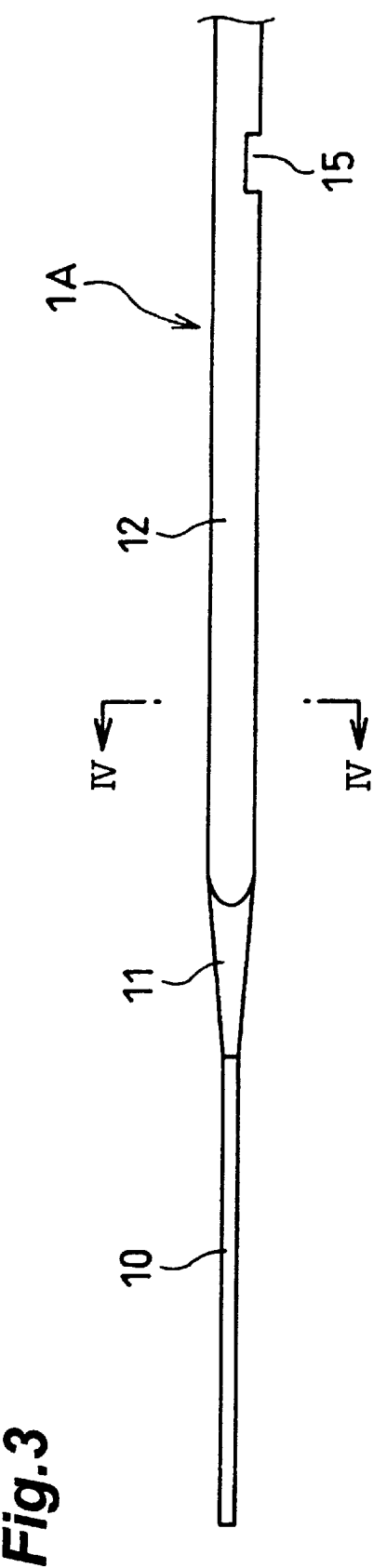
FIGS. 3 and 4 are side and sectional views showing a mold pin used in the mold of FIG. 2, respectively.
Figure 4:
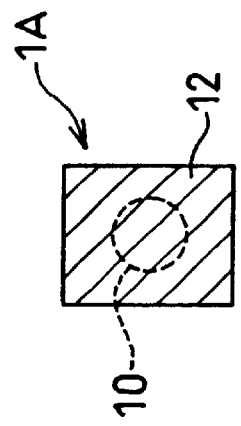

FIG. 2 shows a mold used for manufacturing the connector ferrule 2A. FIGS. 3 and 4 show a detailed configuration of a mold pin 1A.

As shown in FIG. 2, the mold for molding the connector ferrule 2A comprises an upper mold 4, a lower mold 5, and mold pins 1A and 6 slidably disposed between the upper and lower molds 4, 5. In order for the configuration to be seen easily, only two mold pins 1A and one of mold pins 6 are shown in FIG. 2.

The inside of the lower mold 5 is shaped so as to match the outer form of the lower half of the connector ferrule 2A, whereas the outside thereof is provided with V-shaped grooves 52 for holding the mold pins 6 and V-shaped grooves 53 for holding the mold pins 1A. Further, a resin injection port 51 for injecting a resin into the mold is provided.

Though not shown, the inside of the upper mold 4 is shaped so as to match the outer form of the upper half of the connector ferrule 2A, whereas the outside thereof is provided with rectangular grooves 41 for holding the mold pins 6, and a rectangular groove 42 for holding the mold pins 1A.

The mold pin 6 has a cylindrical form with a diameter slightly greater than that of the a guide pin, thereby forming the guide pin hole 24. On the other hand, the mold pins 1A function to form the fiber-arranging holes 20, fiber-guiding portions 23, and coating-accommodating portion 22 in the connector ferrule 2A. As shown in FIGS. 2 to 4, each mold pin 1A is constituted by a front end portion 10, a tapered portion 11 formed on the proximal end side of the front end portion 10, and a prismatic portion 12 formed further on the proximal end side of the tapered portion 11.

The front end portion 10 is adapted to form the fiber-arranging hole 20 in the connector ferrule 2A and has a circular cross section. In view of shrinkage of the resin upon molding and the like, the front end portion 10 has an outside diameter substantially identical to or slightly greater than that of the optical fiber. Specifically, though variable depending on the molding condition and material, the outside diameter of the front end portion 10 is 0.1265 mm when the outside diameter of the optical fiber 30 (see FIG. 5) is 0.125 mm. Also, though variable depending on the dimensions of the connector ferrule 2A, the length of the front end portion 10 is about 10 mm.

The tapered portion 11 is adapted to form the fiber-guiding portion 23 in the connector ferrule 2A, and is formed between the front end portion 10 and the prismatic portion 12 so as to continuously link them, with its outside diameter gradually expanding. Namely, no step is formed at the boundary between the tapered portion 11 and the front end portion 10 and at the boundary between the tapered portion 11 and the prismatic portion 12.

The prismatic portion 12 is adapted to form the coating-accommodating portion 22 in the connector ferrule 2A and has a quadrangular cross section. Each side of the quadrangle in the cross section is greater than the diameter of the above-mentioned front end portion 10. The center axis of the front end portion 10 and that of the prismatic portion 12 align with each other. Though the mold pin 1A used in this embodiment is provided with the tapered portion 11, the front end portion 10 would directly project from the end face of the prismatic portion 12 if no tapered portion 11 were formed.

Further, upper side face of the prismatic portion 12 is provided with a notch 15. The width of the quadrangular cross section of the prismatic portion 12 in the arranging direction is identical to the arranging pitch of the optical fibers 30, and is specifically 0.25 mm. As a consequence, when a plurality of mold pins 1A are arranged with their prismatic portions 12 being in close contact with each other, the front end portions 10 are arranged with a pitch identical to the arranging pitch of the optical fibers 30, whereby the optical fibers 30 can be inserted without bending into the fiber-arranging holes 20 formed by the front end portions 10.

On the other hand, the height from the center axis of the prismatic portion 12 to the base in the quadrangular cross section is identical to the distance from the center axis of the optical fiber 30 to the outer surface of the coated portion 31 in an optical fiber ribbon 3. Namely, when a plurality of mold pins 1A are arranged, the positional relationship between the front end portion 10 and the prismatic portion 12 corresponds to the positional relationship between the optical fiber 30 and the coated portion 31 in the optical fiber ribbon 3 attached to the connector ferrule 2A.

When a fiber optic connector ferrule without the open portion 21 is to be made, the height from the center axis of the prismatic portion 12 to the upper side in the quadrangular cross section is also made identical to the distance from the center axis of the optical fiber 30 to the outer surface of the coated portion 31 in the optical fiber ribbon 3.

A plurality of the above-mentioned mold pins 1A are held parallel to each other by the holding members 13 with the prismatic portions 12 being in close contact with each other, and are installed so as to be able to enter into and retract from a space between the molds 4, 5. The holding members 13 have a holding groove 14. The holding groove 14 is formed along the longitudinal direction of a plurality of the mold pins 1A to be held, and holds them at predetermined positions therein. Provided within the holding groove 14 is a positioning protrusion 16 perpendicular to the longitudinal direction of the mold pins 1A to be held. The positioning protrusion 16 engages the notch 15 of the mold pin 1A being set, thereby positioning a plurality of mold pins 1A in their longitudinal direction.

Also, when the mold pin 1A is set within the mold, the front end of the mold pin 1A is positioned as being held between the V-shaped groove 53 of the lower mold 5 and the rectangular groove 42 of the upper mold 4 from the lower and upper sides. On the other hand, the front end of the mold pin 6 is positioned as being held between the V-shaped groove 52 of the lower mold 5 and the rectangular groove 41 of the upper mold 4 from the lower and upper sides. When the mold pins 1A, 6 are set between the molds 4, 5, the inside of the molds 4, 5 is filled with a molten resin through the resin injection port 51. After the resin is cooled and solidified, the mold pins 1A, 6 are slid backward so as to be pulled out from the molds 4, 5. Subsequently, the molds 4, 5 are vertically opened, and the connector ferrule 2A is taken out therefrom.

When the optical fiber ribbon 3 is to be attached to the connector ferrule 2A, the optical fibers 30 with the exposed front end are introduced into the connector ferrule 2A from the inlet 26 side. The optical fibers 30 introduced into the connector ferrule 2A reach the fiber-guiding portions 23 along the coating-accommodating portion 22, and then are smoothly guided by the fiber-guiding portions 23 so as to be inserted into their corresponding fiber-arranging holes 20. Thereafter, a boot is fitted into the inlet 26, and the optical fiber ribbon 3 is fixed to the connector ferrule 2A by means of an adhesive or clamp member.

Figure 5:
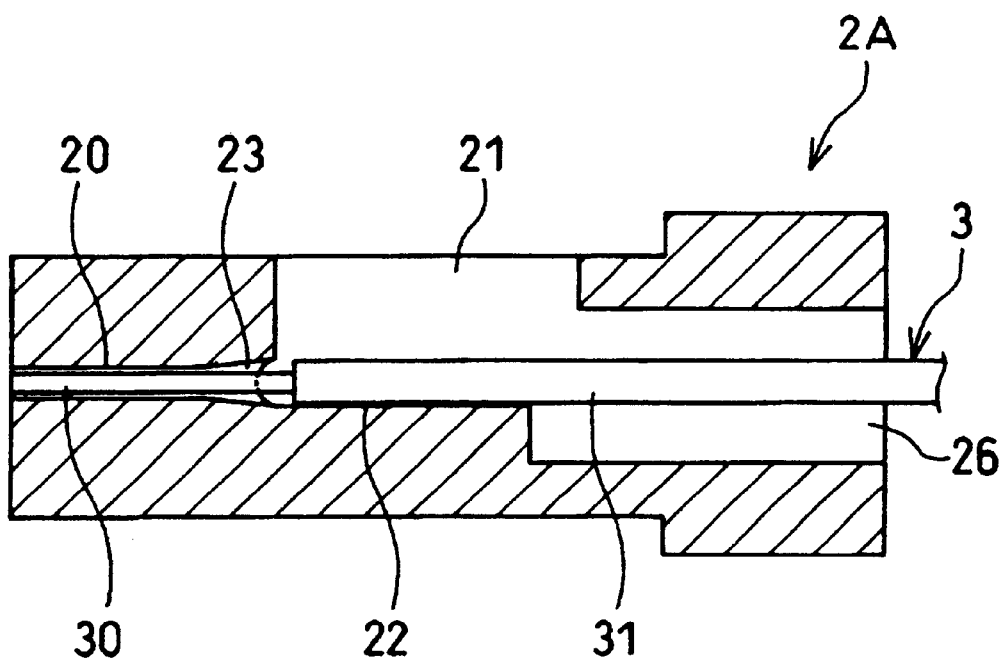
FIG. 5 is a sectional view showing the state where an optical fiber ribbon is attached to the connector ferrule of FIG. 1.

When the optical fibers 30 are accommodated within the fiber-arranging holes 20, then the coated portion 31 of the optical fiber ribbon 3 is accommodated within the coating-accommodating portion 22. Here, since the geometries of the fiber-arranging holes 20 and coating-accommodating portion 22 are formed so as to correspond to those of the optical fibers 30 and coated portion 31 as shown in FIG. 5, the optical fiber ribbon 3 can be mounted so as to keep the optical fibers 30 in the optical fiber ribbon 3 straight without bending.

Figure 6:
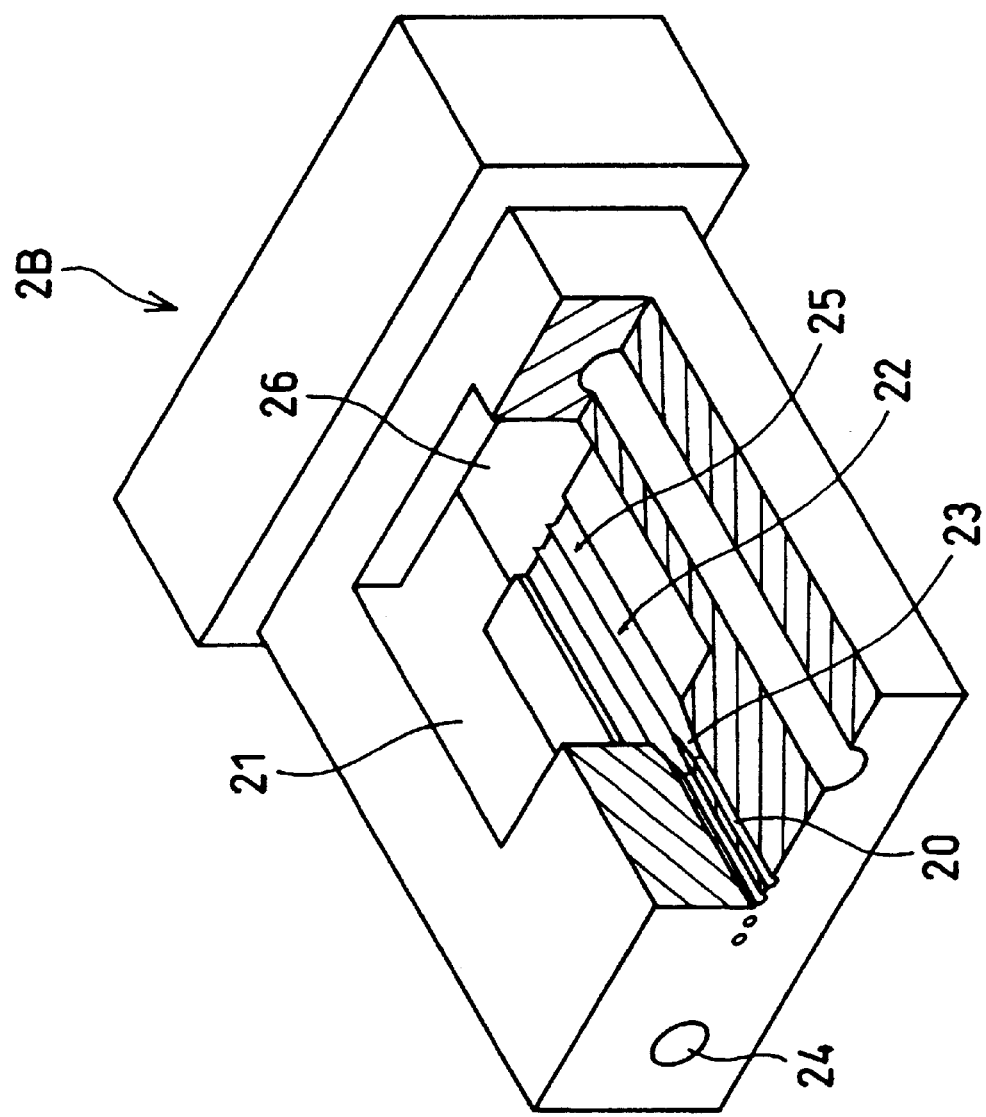
FIG. 6 is a perspective view showing a second embodiment of the connector ferrule in accordance with the present invention.

A second embodiment of the fiber optic connector ferrule in accordance with the present invention will now be explained. FIG. 6 is a perspective view showing the fiber optic connector ferrule 2B of the second embodiment.

In this connector ferrule 2B, a plurality of parallel guiding projections 25 each having a height of $h_1$ are formed on the surface of the coating-accommodating portion 22. Each guiding projection 25 is formed on an extension of an edge of its corresponding fiber-guiding portion 23 along the inserting direction of the optical fiber 30. Consequently, when the optical fiber ribbon 3 is to be attached to the connector ferrule 2B, the guiding projection 25 functions as a guide for guiding the optical fiber 30 to the fiber-guiding portion 23, thus allowing the optical fiber 30 to be inserted into the fiber-arranging hole 20 more smoothly.

Here, since the coated portion 31 of the optical fiber ribbon 3 will be lifted up and bend the optical fiber 30 if the height $h_1$ of the guiding projection 25 is too high, it is necessary for the height $h_1$ to be such that it can be absorbed by a deformation of the coated portion 31 itself, or such that it generates only a slight amount of bending which does not affect transmission characteristics of the optical fiber 30.

The method of making the connector ferrule 2B in accordance with the second embodiment differs from the method of making the connector ferrule 2A in accordance with the first embodiment only in the geometries of mold pins 1B used.

Figure 7:
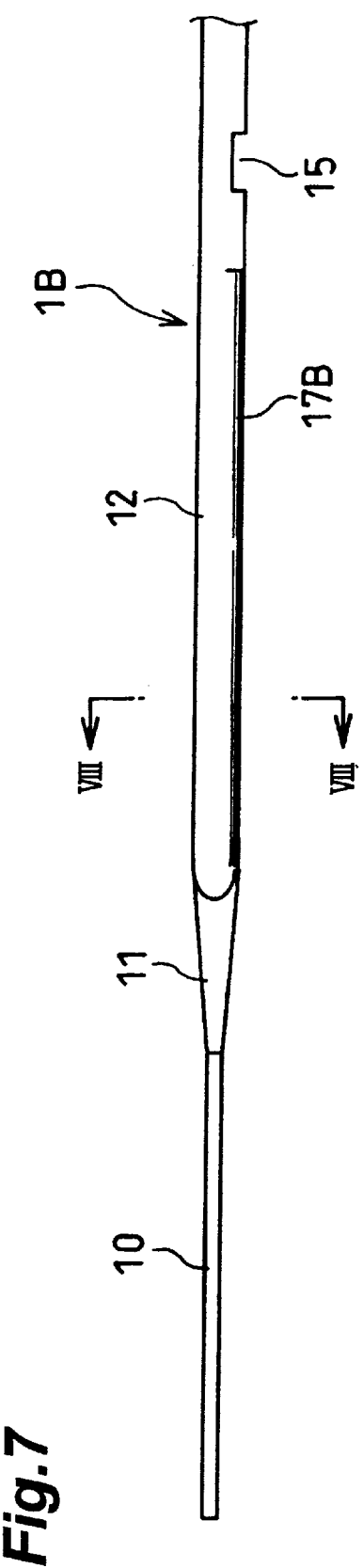
FIGS. 7 and 8 are side and sectional views showing a mold pin used for preparing the connector ferrule of FIG. 6, respectively.
Figure 8:
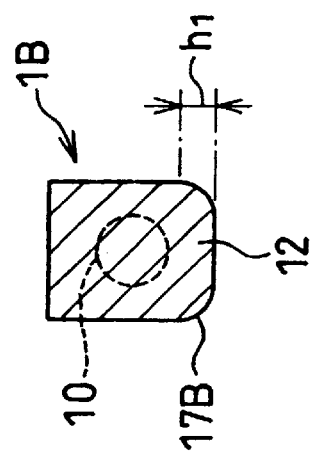

In each mold pin 1B, as shown in FIGS. 7 and 8, both side edges of a certain face (the face provided with a notch 15 in this embodiment) are provided with their respective chamfered portions 17B. Each chamfered portion 17B is formed like a curved face having a predetermined radius of curvature $h_1$ in its cross section, so as to smoothly continue to the respective side face of the prismatic portion 12. No chamfered portion 17B is formed at the part to be gripped by the holding members 13.

The mold pins 1B are gripped by the holding members 13 such that all the chamfered portions 17B are arranged in their arranging direction. Here, if the notch 15 is formed, then the positions of the chambered portions 17B will align with each other as a matter of course. When the connector ferrule 2B is being made, the chamfered portions 17B would align on the lower side of the arranged mold pins 1B. This notch may be formed on lower side face of each mold pin.

Figure 9:
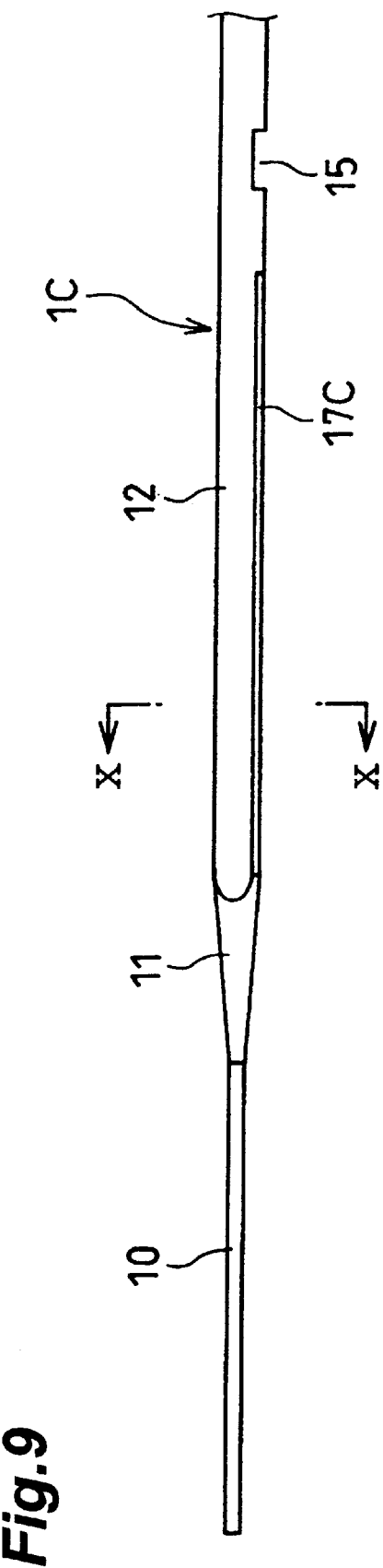
FIGS. 9 and 10 are side and sectional views showing another type mold pin.
Figure 10:
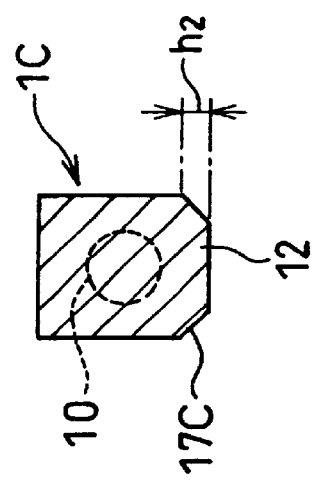

The chamfered portion 17B may be formed not only as a curved chamfered portion 17B such as the one shown in FIGS. 7 and 8, but also as a planar chambered portion 17C such as the one shown in FIGS. 9 and 10. A mold pin 1C having such chamfered portions 17C can similarly form guiding projections. In this case, the height $h_2$ of the chamfered portion 17C corresponds to the above-mentioned height (radius of curvature) $h_1$.

The fiber optic connector ferrule and the method of making the same in accordance with the present invention should not be restricted to the above-mentioned embodiments. For example, though the fiber optic connector ferrule has the open portion 21 in the above-mentioned embodiments, the fiber optic connector ferrule may be free of the open portion 21. In this case, the coating-accommodating portion 22 is not formed like a groove but a hole.

Also, when a chamfered portion is to be provided, it may be formed at one side edge in a face of the mold pin instead of both side edges thereof. Even in this configuration, if one chamfered portion is positioned at the mating faces of two mold pins when the mold pins are held by holding members, then a guiding projection for guiding each optical fiber to its corresponding fiber-arranging hole can be formed.

The present invention is not limited to the fiber optic connector ferrule for an optical fiber ribbon. Single optical fiber cables can be also secured to the fiber optic connector ferrule according to the present invention.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of making a fiber optic connector ferrule in which one or a plurality of fiber-arranging holes for arranging and securing respective optical fibers are provided, said method comprising the steps of:

disposing one or a plurality of mold pins each having a columnar portion formed on a distal end side thereof and a prismatic portion, formed on a proximal end side thereof, having substantially a quadrangular cross section, with side faces of the prismatic portions being in contact with each other, within a mold such that each mold pin is slidable in an axial direction of the columnar and prismatic portions; and filling said mold with a resin, and axially pulling off each of said mold pins after the resin is cured, thereby each of said fiber-arranging holes being formed and a coating-accommodating portion for mounting a coated portion of said respective optical fibers being formed.

2. A method of making a fiber optic connector ferrule according to claim 1, wherein at least one side edge of said prismatic portion is chamfered along the lengthwise direction of said mold pins, said chamfered portion being disposed, when said mold pins are being arranged within said mold, at a part forming said coating-accommodating portion.

3. A method of making a fiber optic connector ferrule according to claim 1, wherein a tapered portion whose outside diameter gradually expands in a direction away from said columnar portion is disposed between said columnar portion and said prismatic portion.

4. A method of making a fiber optic connector ferrule according to claim 1, wherein the upper or lower side face of said prismatic portion is provided with a predetermined notch, said notch being used for positioning and arranging each mold pin at a predetermined position within said mold.

5. A fiber optic connector ferrule in which one or a plurality of fiber-arranging holes for arranging and securing respective optical fibers are formed parallel to each other therewithin, said fiber optic connector ferrule comprising:

a coating-accommodating portion for mounting and supporting the coated portion of said optical fibers with maintaining the axis of said optical fibers substantially linear from the front end in said fiber-arranging hole to said coated portion.

* * * * *